(12) United States Patent
Alfonso

(10) Patent No.: US 8,687,095 B2
(45) Date of Patent: Apr. 1, 2014

(54) METHOD AND DEVICE FOR DE-NOISING A DIGITAL VIDEO SIGNAL, AND CORRESPONDING COMPUTER PROGRAM PRODUCT

(75) Inventor: Daniele Alfonso, Magenta (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 38 days.

(21) Appl. No.: 13/302,174

(22) Filed: Nov. 22, 2011

(65) Prior Publication Data

US 2012/0127350 A1    May 24, 2012

(30) Foreign Application Priority Data

Nov. 24, 2010   (IT) ............................... TO2010A0931

(51) Int. Cl.
*H04N 5/217*   (2011.01)
*H04N 5/228*   (2006.01)
*H04N 9/64*   (2006.01)

(52) U.S. Cl.
USPC .................... 348/241; 348/222.1; 348/243

(58) Field of Classification Search
USPC ......... 348/241, 533, 470, 535, 606, 622, 607, 348/627, 683, 243, 222.1
See application file for complete search history.

(56) References Cited

U.S. PATENT DOCUMENTS

| | | | |
|---|---|---|---|
| 4,761,819 A | 8/1988 | Denison et al. | |
| 5,461,655 A | 10/1995 | Vuylsteke et al. | |
| 5,841,911 A * | 11/1998 | Kopeika et al. | 382/254 |
| 5,909,505 A * | 6/1999 | Katayama et al. | 382/164 |
| 6,256,403 B1 | 7/2001 | Florent et al. | |
| 6,542,202 B2 * | 4/2003 | Takeda et al. | 348/678 |
| 6,657,676 B1 | 12/2003 | Borneo et al. | |
| 6,985,613 B2 | 1/2006 | Ogino | |
| 7,652,250 B2 * | 1/2010 | Erdtmann | 250/332 |
| 2001/0033692 A1 | 10/2001 | Borneo et al. | |
| 2002/0176067 A1 * | 11/2002 | Charbon | 356/4.01 |
| 2003/0189655 A1 | 10/2003 | Lim et al. | |
| 2003/0214590 A1 * | 11/2003 | Matherson | 348/243 |
| 2005/0030393 A1 * | 2/2005 | Tull | 348/241 |
| 2006/0029287 A1 * | 2/2006 | Hayashi et al. | 382/261 |
| 2008/0144958 A1 | 6/2008 | Lee | |

(Continued)

FOREIGN PATENT DOCUMENTS

| | | |
|---|---|---|
| EP | 1100260 | 5/2001 |
| EP | 1126729 | 8/2001 |
| EP | 2244459 | 10/2010 |
| JP | 2001186379 | 7/2001 |

OTHER PUBLICATIONS

Borneo et al., "An Innovative Adaptive Noise Reduction Filter for Moving Pictures Based on Modified Duncan Range Test", St Journal of System Research, No. 0, 2000, pp. 14-22.

(Continued)

*Primary Examiner* — Nhan T Tran
*Assistant Examiner* — Chan Nguyen
(74) *Attorney, Agent, or Firm* — Allen, Dyer, Doppelt, Milbrath & Gilchrist, P.A.

(57) ABSTRACT

A method may denoise a digital video signal produced by a photoelectric sensor as a matrix of pixel signals affected by both thermal noise and impulsive noise. The method may include estimating the noise level associated to the pixel signals, and filtering the pixel signals with an attenuation factor that is a function of the estimated noise level.

25 Claims, 2 Drawing Sheets

(56) References Cited

U.S. PATENT DOCUMENTS

2009/0323827 A1* 12/2009 Bjontegaard ............. 375/240.27
2010/0271495 A1* 10/2010 Tamura ...................... 348/208.4
2010/0298728 A1* 11/2010 Addison et al. ............... 600/504

OTHER PUBLICATIONS

Timmerman et al., "Multiscale Modeling and Estimation of Poisson Processes With Application to Photon-Limited Imaging", IEEE Transactions on Information Theory, vol. 45, No. 3, Apr. 1999, pp. 846-862.

Wang et al., "Variation-Based Approach to Restoring Blurred Images Corrupted by Poisson Noise", ICSP2006 Proceedings, IEEE, 2006, pp. 1-4.

"Advanced Video Coding for Generic Audio-Visual Services," ITU-T Rec. H.264 and ISO/IEC 14496-10 (MPEP-4 AVC), Version 11, Mar. 2009, 666 pages.

* cited by examiner

METHOD AND DEVICE FOR DE-NOISING A DIGITAL VIDEO SIGNAL, AND CORRESPONDING COMPUTER PROGRAM PRODUCT

FIELD OF THE INVENTION

The present disclosure relates to digital video-signal processing.

BACKGROUND OF THE INVENTION

Mobile devices that acquire images, such as, for example, 3G phones, camcorders, I-Phones®, etc., typically comprise an integrated image sensor (for example, a CMOS image sensor) coupled to a digital video encoder. In various embodiments, an image sensor, such as, for example, a CMOS image sensor, may comprise an array of active pixel sensors (APSs), each comprising a photoelectric converter element, such as, for example, a photodiode or a phototransistor, which may able to convert the received photons into an electric output current. This current can be used for charging a capacitance and generating a difference of potential corresponding to the light signal at input. This analog signal may then be converted into digital form and processed by a processor, such as, for example, a so-called "image sensor pipeline" (ISP). It is thus possible to obtain an output digital image, which may be sent to a digital video encoder to be subjected to a compression operation.

A device is schematically represented in FIG. 1, where the reference number 10 designates the image sensor on which the light signal LS impinges, and the reference number 12 designates the processor designed to produce an output digital image I. The image I is sent to the encoder 14, which generates on its output a corresponding bit stream BS.

The signal generated the sensor 10 (for example, a CMOS sensor) may be affected by two main types of noise: thermal noise and impulsive noise (shot noise). Thermal noise (sometimes also referred to as "Johnson-Nyquist noise") may be generated by thermal agitation, which may induce a Brownian motion in the electrons that flow in a semiconductor, thus causing a random fluctuation of the electrical potential. Thermal noise can be basically modeled as a white noise, i.e. as a noise that ideally covers the entire frequency spectrum. As is known, the thermal noise may be modeled from the analytical standpoint in the form of a random variable/process with a probability-distribution function of a Gaussian type, the variance of which expresses the power of the thermal noise.

Impulsive noise or shot noise arises when the finite number of the particles that carry energy—as is the case of the electrons that flow through a junction in a semiconductor, or the photons in an optical device—is so low that any change in the number causes a measurable fluctuation in the corresponding signal.

In poor-lighting conditions or when the dimensions of the pixel sensor or APS are particularly small (a situation that is rather common today when the number of megapixels in the image sensors increases constantly), the number of photons arriving on each pixel sensor or APS may be very small so that the photocurrent (i.e. the electric current generated by the photoelectric converter, for example, a phototransistor) is affected by impulsive noise.

Given that impulsive noise is a random fluctuation associated to a discrete event, it may be modeled from the analytical standpoint as a random variable/process with Poisson distribution, defined by a probability function of the type:

$$f(k,\lambda) = \frac{\lambda^k e^{-\lambda}}{k!}.$$

In a Poisson random process, both the mean value and the variance are equal to $\lambda$. Poisson noise depends upon the number of incoming photons and is hence correlated to the input signal, whereas this does not occur for Gaussian noise. This implies the fact that different segments in a sequence of digital images can contain different amounts of noise, so that, to be effective, filtering of the Poisson noise may take this phenomenon into account. Whereas, the typical approaches are dedicated to filtering Gaussian noise, relatively little attention has so far been dedicated to the problem of filtering Poisson noise.

SUMMARY OF THE INVENTION

Given the above, filtering techniques specifically dedicated to impulsive noise (which can be modeled as Poisson process) could lead to advantages.

In particular, considering the adverse effect of noise on digital video encoding, it would be desirable to provide an approach that may be able to overcome the intrinsic drawbacks of approaches based upon the criteria of modeling the noise of an optical sensor (for example, a CMOS image sensor) as a Gaussian process, so as to provide techniques designed for reduction of Poisson noise.

According to aspects of the present disclosure, a method, a corresponding device, and a computer program product are disclosed. The computer program product can be loaded into the memory of at least one computer and comprises portions of software code that are able to implement the steps of the method when the product is run on at least one computer. As used herein, reference to such a computer program product is understood as being equivalent to a computer-readable means containing instructions for control of the processing system to co-ordinate implementation of the method according to the present disclosure. Reference to "at least one computer" is meant to highlight the possibility of the present disclosure being implemented in a modular and/or distributed form.

In various embodiments, a technique for filtering noise is disclosed and can be applied to sequences of digital video images in order to improve the efficiency of the subsequent digital video compression. In various embodiments, the method may be specifically dedicated to filtering the noise generated by image sensors such as, for example, CMOS sensors. It may be possible for the noise to be modeled, rather than by resorting to the traditional model of additive white Gaussian noise (AWGN), as a process with Poisson statistical distribution correlated to the signal. In various embodiments, the current techniques for filtering of white Gaussian noise can be used in a way so as to achieve an efficient removal of Poisson noise.

BRIEF DESCRIPTION OF THE DRAWINGS

The invention will now be described, purely by way of non-limiting example, with reference to annexed figures, wherein.

DETAILED DESCRIPTION OF THE PREFERRED EMBODIMENTS

Figure 1:
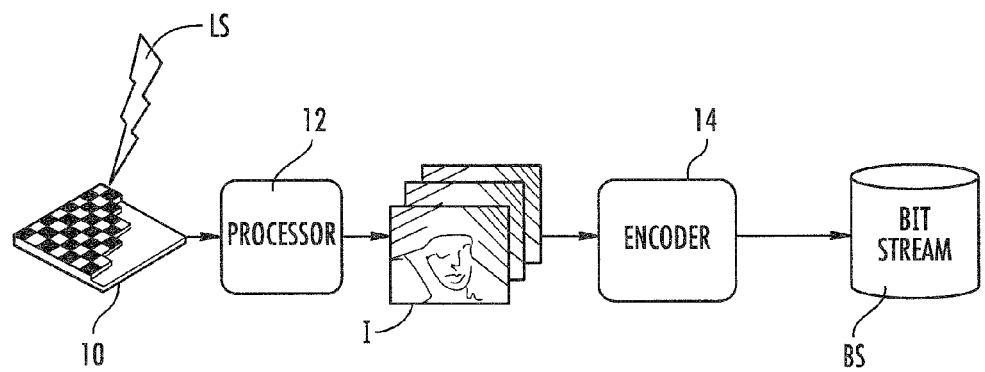
FIG. 1 is a schematic block diagram of a system, according to the prior art.

It has been noted that in some practical applications, the noise generated by a sensor, such as the sensor 10 (FIG. 1), considered herein is filtered by approximating it with a simple Gaussian random process, hence applying thereto typical techniques for filtering white noise. In this regard, it has been noted that a random variable/process of a Gaussian type represents a rough approximation of the noise that can affect a sensor, such as the sensor 10 considered herein.

The noise can have a negative effect in digital video-signal encoding for at least two different reasons. In the first place, noise determines a deterioration in the perceived quality of the video signal so that—given the same quantization step—a video containing noise is perceived as worse than the same video signal without noise.

In the second place, noise introduces into the video signal high frequencies both at a spatial level and at a temporal level, and this renders compression more difficult since correlation between the pixels is impaired. In order to compress the signal, the video-encoding process exploits the correlation between pixels. Consequently, once again, given the same quantization step, a compressed stream corresponding to a video signal affected by noise ends up requiring a higher bit-rate as compared to what would otherwise may be required by the same video signal in the absence of noise.

It should moreover be recalled that quantization affects to a considerable extent the compression factor in a "lossy" video-encoding system, i.e. a system where there is a loss of quality as compared to the original signal. Quantization has an effect that can be likened to that of a low-pass filtering for spatial frequencies, with the consequent elimination of the higher frequencies, which are less visible to the human eye.

For instance, the known digital video-encoding technique H. 264/MPEG-4 AVC uses a quantization parameter QP that embraces the range comprised between 1 and 51, where 1 corresponds to the minimum compression (and consequently to a higher bit-rate and a higher quality), while 51 corresponds to the maximum compression (and consequently to a lower bit-rate and a lower quality). It should also be recalled that the spectrum of a video signal of a natural type (i.e. a non-synthetic or artificially created one) is characterized by components with low spatial and temporal frequency, whereas noise lies at the higher frequencies of the spectrum.

For this reason, the denoising filters generically fall within the category of non-linear low-pass filters, the function of which is to apply an attenuation factor to the high-frequency components. For a general review of the subject matter outlined above, useful reference may be made to the following documents: A. Borneo, L. Salinari, "Process for estimating the noise level in sequences of images and a device therefor;" U.S. Patent Application Publication No. 2001/033692; EP1126729; A. Borneo, L. Salinari, "Spatio-temporal filtering method for noise reduction during a pre-processing of picture sequences in video encoders;" U.S. Pat. No. 6,657, 676; European Patent No. EP1100260; Japanese Patent NO. JP2001186379; ITU-T and ISO/IEC JTC 1; "Advanced Video Coding for Generic Audio-Visual Services," ITU-T Rec. H.264 and ISO/IEC 14496-10 (MPEG-4 AVC), Version 11, March 2009; A. Borneo, L. Salinari, D. Sirtori, "An Innovative Adaptive Noise Reduction Filter for Moving Pictures Based on Modified Duncan Range Test," ST Journal of System Research, No. 0, July 2003; U.S. Pat. No. 6,256,403; U.S. Pat. No. 4,761,819; U.S. Pat. No. 6,985,613; U.S. Pat. No. 5,461,655; Publication number: U.S. Patent Application Publication No. 2008/0144958; U.S. Patent Application Publication No. 2003/0189655; G. Wang, Z. Wanag, M. Xie, Y. Li, "Variation-Based Approach to Restoring Blurred Images Corrupted by Poisson Noise," Proc. ICSP 2006; and K. Timmermann, R. D. Novak, "Multiscale Modeling and Estimation of Poisson Processes with Application to Photon-Limited Imaging," IEEE Trans. on Inf. Theory, VOL. 45, NO. 3, April 1999.

In the following description, various specific details are illustrated at an in-depth understanding of the embodiments. The embodiments can be provided without one or more of the specific details, or with other methods, components materials, etc. In other cases, known structures, materials, or operations are not shown or described in detail so that the various aspects of the embodiments may not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics can be combined in any adequate way in one or more embodiments. The references used herein are only provided for convenience and hence do not define the sphere of protection or the scope of the embodiments.

As already indicated previously, the noise generated by a video sensor 10 (such as, for example, a CMOS image sensor) comprises two main components, i.e., thermal noise and impulsive noise (shot noise). The former component of noise can be modeled as a random process $n_g$ with standard deviation $\sigma_g$ with Gaussian distribution, whereas the latter can be approximated as a random process $n_p$ with Poisson distribution with standard deviation $\sigma_p$ depending upon the input signal on the basis of the following formula, where f is the signal and $\alpha$ is a multiplying factor defining the intensity of the noise:

$$\sigma_p = \sqrt{\alpha \cdot f}$$

Figure 2:
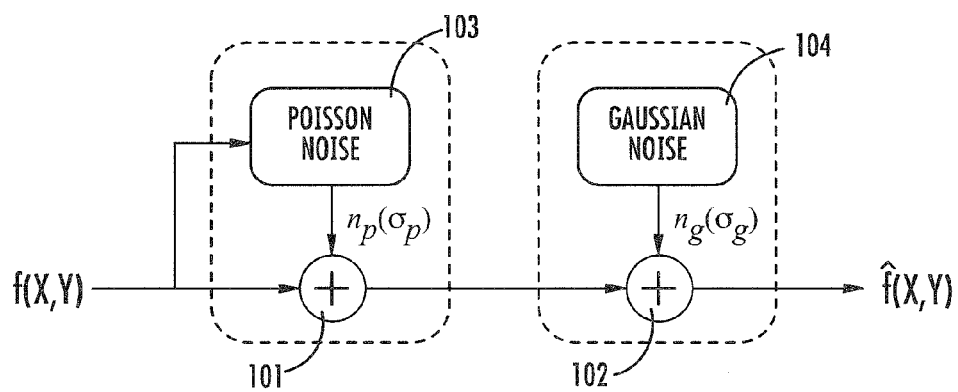
FIG. 2 is a schematic block diagram of a model of noise underlying various embodiments, according to the present disclosure.

The noise of a sensor, such as the sensor 10, can hence be modeled as schematically represented in FIG. 2. In the representation, the digital image signal not affected by noise can be represented as a matrix of samples f(x,y), whereas the corresponding image affected by noise can be represented by a matrix $$\hat{f}(x,y) = f(x,y) + n_p(\sigma_p) + n_g(\sigma_g);$$

where $\sigma_p$ has the expression recalled previously.

In other words, the matrix representing the image affected by noise can be viewed, according to the functional scheme of FIG. 2, as deriving from the addition to the image without noise f(x,y) of two contributions of noise applied in respective adder nodes 101 and 102, i.e.: a first noise contribution or component $n_p(\sigma_p)$, which corresponds to the impulsive noise (Poisson process) represented by block 103 and functionally linked to the signal f(x,y); and a second noise contribution or component $n_g(\sigma_g)$, which corresponds to the Gaussian thermal noise represented by block 104 and, in general, does not have a functional dependency upon the signal f(x,y). It has been noted that currently used filtering approaches aim principally at filtering the Gaussian component (thermal noise), i.e., the component $n_g$.

In some embodiments, attention will be concentrated on the component $n_p$. In various embodiments, it may be possible to approximate locally (i.e., pixel-by-pixel) the random variable/process $n_p$ in the form of a Gaussian random variable/process, the variance (and hence the standard deviation) of which depends upon the current value of the pixels. In various embodiments, it is consequently possible to use techniques dedicated to Gaussian noise to filter in an effective way the impulsive noise that can be modeled as a Poisson process.

Figure 3:
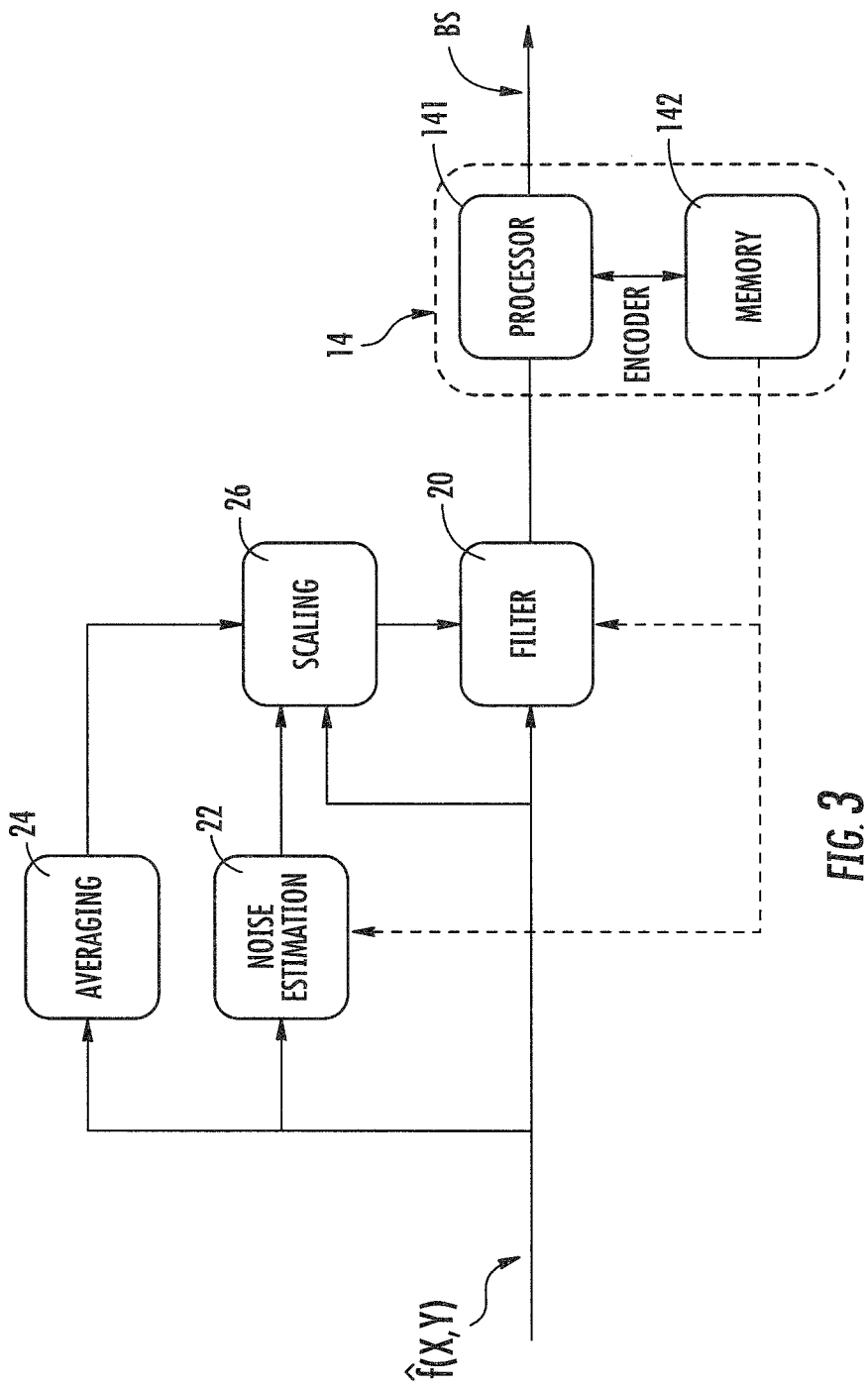
FIG. 3 is a schematic block diagram of an embodiment, according to the present disclosure.

In some embodiments, this result can be obtained operating as illustrated schematically in FIG. 3. The figure represents embodiments in which, starting from the "noisy" image/video signal $\hat{f}(x,y)$, via a filter 20 designed to perform a function antagonistic to noise (noise filter), a denoised signal is obtained (i.e. a signal having its noise component reduced), which can be supplied to the video encoder 14 to give rise to the output stream BS. In some embodiments, from the standpoint of implementation, the set of the functional blocks represented in FIG. 3 can be comprised in the block 12 and/or in the block 14 of the general scheme of FIG. 1.

In various embodiments, to which the ensuing description refers by way of example, the blocks designated by 20, 22, 24 and 26 can be ideally viewed as comprised in the processing block 12, whereas the blocks 141 and 142 may be comprised in the video encoder 14, it being thus possible to exploit, in various embodiments, the encoding memory 142 possibly already comprised in the encoder 14. In some embodiments, the skilled person may, however, readily conceive an arrangement of these functional blocks different from the one suggested herein by way of non-limiting example in the representation of FIG. 3.

The representation highlights the fact that, in some embodiments, the encoder 14 can comprise, to be able to receive at input a sequence of digital images and generate as corresponding output a compressed bit stream, a calculation part 141 and an encoding-memory part 142. In various embodiments, the calculation part or module 141 can perform at least one temporal-prediction operation, by encoding the signal of the current image (operating, if necessary, at a frame level or a different image unit, according to criteria in themselves known) as a difference, for example, motion-compensated, with respect to one or more images (either preceding or subsequent ones, according to known techniques) stored in the encoding memory 142. In some embodiments, the memory 142 can be connected to the module 22 that is to perform a noise-estimation function.

In various embodiments, the noise-estimation module 22 receives at input: an image (or portion of image) belonging to the signal affected by noise $\hat{f}(x,y)$; and possibly one or more images (usually preceding ones) of the same video sequence drawn from the memory 142. The purpose of this is to enable generation at the output of an estimate of the noise level in the current image.

In some embodiments, the module 22 operates on the image as a whole, thus supplying an average value of noise, calculated in an averaging module 24, which represents the average noise level for all the pixels. In various embodiments, this noise level can be determined, for example, by assuming that the noise can be viewed as having a Gaussian distribution with a constant intensity over all the image elements. The average value can be designated by $\sigma_m$.

The processing functions in question can be performed according to typical criteria, for example, as described in the document [1] already cited previously. In various embodiments, the module 24 can be configured so as to compute the average value of the pixels belonging to the current image and transfer the result to a scaling module or stage 26.

If the current image is represented by a matrix of elements $x_{ij}$, of rank N by M, the average value is given by $$x_m = \frac{1}{MN} \sum_{i=0}^{N-1} \sum_{j=0}^{M-1} x_{ij}.$$

The scaling module 26 generates, starting from the outputs of the modules 22 and 24 (and from the input signal $\hat{f}(x,y)$), an estimated noise level for the current pixels. In some embodiments, this can be performed on the basis of the formula given in what follows, where: $\sigma_m$ is the standard deviation of the noise, understood as average value for the entire image calculated in the noise-estimation module 22; $x_m$ is the average value per pixel as calculated by the module or stage 24; and $x_l$ is the local value of the pixel currently undergoing the filtering process; and $\sigma_l$ is the standard deviation of the Poisson noise for the current pixel, estimated as follows:

$$\sigma_l = \sqrt{\frac{x_l}{x_m}} \cdot \sigma_m.$$

In some embodiments, the formula appearing above is not calculated analytically pixel-by-pixel, but the operations of division and square root are implemented via a look-up table (LUT) with pre-calculated factors. The size of this LUT can be minimized by quantizing $x_l$ and $x_m$, and reducing the precision from 8 bits to a lower number considered adequate.

In various embodiments, the filter 20 consequently receives as input: an image or, in general, a plurality of pixel signals representing at least part of an image belonging to a sequence of digital images constituting the signal $\hat{f}(x,y)$ to be subjected to filtering. The filter 20 also receives the estimated noise level (by the module 22) associated to each pixel of the image, and possibly one or more images (for example, preceding images) in the same video sequence.

The output of the filter 20 constitutes the reduced noise video signal. The filtering stage or module 20 can be implemented in different ways. In some embodiments, the stage or module 20 can be provided so as to receive a different estimate of the noise level for each pixel of the current image so as to be able to apply different filtering intensities for each pixel.

In some embodiments, the stage or module 20 can be provided as described in the document [2] cited previously, assuming also that the noise level (which, as has been seen, in the case of the impulsive noise depends upon the signal level) received at input determines the attenuation factor of the filter applied for removing the high spatial and temporal frequencies corresponding to the noise.

As already recalled previously, the denoising filters fall generically in the category of the non-linear low-pass filters, the function of which is to apply an attenuation factor to the high-frequency components. For example, in the case of the document [2] to which reference has been made previously as example of a possible embodiment of the module 20, an averaging operation is carried out on a set of values, the amplitude D of which is determined by the formula 2×D=3× $\sigma$, so that the higher the noise level, the greater the number of values on which the averaging operation is performed, and the greater the effect of attenuation of the high frequencies.

In various embodiments, it is consequently envisioned to reduce the noise of a digital video signal produced by a photoelectric sensor as matrix of pixel signals affected by noise (Gaussian thermal noise $n_g$—independent of the signal—and Poisson impulsive noise $n_p$—depending upon the signal). In various embodiments, the method can comprise: estimating the noise level associated to the aforesaid pixel signals, and filtering the pixel signals (for example, in the module 20) with a factor of attenuation of the high frequencies that is a function of the estimated noise level.

In some embodiments, the method can comprise: estimating the associated noise level in a distinct way for each of the pixel signals, and filtering each pixel signal with a factor of attenuation of the high frequencies that is a function of the respective estimated noise level in a distinct way for the pixel signal. In other embodiments, this can entail, for example: estimating (for instance, in the module 22) an average noise level associated to a plurality of pixel signals, which define at least a part of an image of a digital video sequence; determining (for instance, in the module 24) an average value of the pixel signals of the plurality; and determining the respective estimated noise level in a distinct way for each pixel signal by weighting the average noise level as a function (for example, the square root) of the ratio between each pixel signal and the average value of the pixel signals of the plurality.

In some embodiments, at least one between the operations of estimating the noise level associated to the pixel signals, and filtering the pixel signals can be carried out operating on at least two images of a digital video sequence. In some embodiments, it may be envisioned to subject the denoised digital video signal to encoding by operating on at least two images of a digital video sequence, with at least one of the images stored in an encoding memory. At least one between the operations of estimating the noise level associated to the pixel signals and filtering the pixel signals can be carried out by operating on at least one image stored in the aforesaid encoding memory.

The performance of certain embodiments were recorded for fifteen different high-definition (HD) video sequences in 1280×720 format, in the presence of added Poisson noise with five different values of intensity, i.e. with $\alpha=\{0.10; 0.25; 0.50; 0.75; 1\}$ where $\alpha=0.10$ corresponds to an extremely low noise and $\alpha=1.00$ corresponds to a very troublesome noise level. The seventy-five resulting video sequences were subjected to compression in a video encoder operating according to the standard H.264/MPEG-4AVC using four different quantization parameters QP={22, 27, 32, 37} to evaluate the encoding efficiency over a wide range of bitrates.

For the evaluations, the video encoder was configured so as to carry out filtering of the noise in two different ways: in a first configuration, using the algorithms described, for example, in the first two documents referred to previously; and in a second configuration, using a filtering method according to the embodiments considered herein by way of example. There was consequently generated a set of six hundred different H.264/AVC bit streams to constitute a test set of data.

All the tests showed that in the presence of a video signal affected by Poisson noise as generated by a video sensor of a CMOS type, the approach according to the herein disclosed embodiments proves more effective as compared to typical filtering for Gaussian noise. A first set of tests were conducted comparing the two approaches and considering as a main parameter, the bit-rates of the resulting bit stream given the same quantization parameter QP.

As already mentioned previously, the noise renders the video signal more difficult to compress in so far as it impairs space-time correlation between the pixels, so that a lower bit rate given the same quantization parameter QP shows that the noise has been removed in a more effective way. The tests have shown that the approach according to the embodiments may enable a gain in efficiency (determined as percentage value obtained by averaging the results over all fifteen sequences and the four values of quantization parameter QP) of approximately 3.9%, in the presence of a low noise, and approximately 17.9%, in the presence of a considerable noise, which means an average gain of 12.5% in terms of gain in encoding efficiency.

The evaluations were correlated with a numerical evaluation of the corresponding visual quality in terms of peak signal-to-noise ratio (PSNR). PSNR usually shows a good correlation with the video quality perceived in the presence of non-filtered video signals. In fact, when noisy sequences are treated with a noise-reducing filter, it can happen that a better result from the visual standpoint may be associated to an inferior PSNR. In any case, the tests have shown that the approach according to the embodiments can produce an average loss in terms of PSNR of 0.15 dB on the component of luminance (value barely appreciable by a final user), whereas the tests of subjective quality have yielded very positive results.

For example, in the case of the test sequence known as "Cyclist," the gain "in termini" of encoding efficiency (i.e., the reduction in bit rate given the same quantization parameter QP) that can be achieved according to the embodiments ranges from 7.5% (as average over the four quantization parameters QP considered) for a low noise level ($\alpha=0.10$) to 24.6% (once again as average over four quantization parameters QP) in the presence of considerable noise ($\alpha=1.00$).

Without prejudice to the principle of the invention, the details of construction and the embodiments may vary, even significantly, with respect to what has been illustrated herein purely by way of non-limiting example, without thereby departing from the scope of the invention, as defined by the annexed claims.

That which is claimed is:

1. A method of reducing noise in a digital video signal generated by a sensor comprising a matrix of pixels generating a plurality of pixel signals, the method comprising:
   estimating a respective thermal noise level for each pixel signal in the plurality thereof based upon a first distribution;
   estimating a respective shot noise level for each pixel signal in the plurality thereof based upon a second Poisson distribution; and
   filtering each pixel signal with a respective attenuation factor based upon the respective estimated thermal noise level and respective estimated shot noise level.

2. The method of claim 1 wherein filtering comprises filtering spatial and temporal frequencies corresponding to noise.

3. The method of claim 1 wherein filtering comprises averaging a number of values; and
   wherein the number of values being averaged increases with the estimated noise level.

4. The method of claim 1 further comprising:
   estimating an average noise level associated with a group of pixel signals from the plurality thereof, the group of pixel signals defining at least a part of an image in the digital video signal;
   determining an average level of the group of pixel signals; and
   determining a respective estimated noise level for the group of pixel signals by weighting the average noise level as a function of a ratio of the pixel signal and the average level of the group of pixel signals.

5. The method of claim 4 further comprising estimating the respective noise level for each pixel signal by weighting the average noise level with a square root value of the ratio.

6. The method of claim 5 further comprising determining at least one of the ratio and the square root value based upon a plurality of values in a look-up table.

7. The method of claim 1 further comprising performing the estimating of the noise level associated with the plurality of pixel signals based upon a plurality of images in the digital video signal.

8. The method of claim 1 further comprising performing the filtering of the plurality of pixel signals based upon a plurality of images in the digital video signal.

9. The method of claim 7 further comprising encoding the digital video signal by operating on the plurality of images in the digital video signal with at least one of the plurality of images stored in an encoding memory.

10. The method of claim 9 further comprising performing the estimating of the noise level associated with the plurality of pixel signals by operating on the at least one image stored in the encoding memory.

11. The method of claim 9 further comprising performing the filtering of the plurality of pixel signals by operating on the at least one image stored in the encoding memory.

12. A device for reducing noise in a digital video signal from a sensor comprising a matrix of pixels generating a plurality of pixel signals, the device comprising:
   an encoder; and
   an processor to be coupled to said encoder and configured to
      estimate a respective thermal noise level for each pixel signal in the plurality thereof based upon a first distribution;
      estimate a respective shot noise level for each pixel signal in the plurality thereof based upon a second Poisson distribution; and
      filter each pixel signal with a respective attenuation factor based upon the respective estimated thermal noise level and respective estimated shot noise level.

13. The device of claim 12 wherein said encoder is configured to reduce the noise in the digital video signal and includes an encoding memory.

14. The device of claim 12 wherein said processor is configured to filter by filtering spatial and temporal frequencies corresponding to noise.

15. The device of claim 12 wherein said processor is configured to filter by averaging a number of values; and wherein the number of values being averaged increases with the estimated noise level.

16. The device of claim 12 wherein said processor is configured to:
   estimate an average noise level associated with a group of pixel signals from the plurality thereof, the group of pixel signals defining at least a part of an image in the digital video signal;
   determine an average level of the group of pixel signals; and
   determine a respective estimated noise level for the group of pixel signals by weighting the average noise level as a function of a ratio of the pixel signal and the average level of the group of pixel signals.

17. The device of claim 16 wherein said processor is configured to estimate the respective noise level for each pixel signal by weighting the average noise level with a square root value of the ratio.

18. The device of claim 17 wherein said processor is configured to determine at least one of the ratio and the square root value based upon a plurality of values in a look-up table.

19. A computer-implemented method for reducing noise in a digital video signal from a sensor comprising a matrix of pixels generating a plurality of pixel signals, the method comprising:
   estimating a respective thermal noise level for each pixel signal in the plurality thereof based upon a first distribution;
   estimating a respective shot noise level for each pixel signal in the plurality thereof based upon a second Poisson distribution; and
   filtering each pixel signal with a respective attenuation factor based upon the respective estimated thermal noise level and respective estimated shot noise level.

20. The computer-implemented method of claim 19 wherein filtering comprises filtering spatial and temporal frequencies corresponding to noise.

21. The computer-implemented method of claim 19 wherein filtering comprises averaging a number of values; and wherein the number of values being averaged increases with the estimated noise level.

22. The computer-implemented method of claim 19 wherein the method further comprises:
   estimating an average noise level associated with a group of pixel signals from the plurality thereof, the group of pixel signals defining at least a part of an image in the digital video signal;
   determining an average level of the group of pixel signals; and
   determining a respective estimated noise level for the group of pixel signals by weighting the average noise level as a function of a ratio of the pixel signal and the average level of the group of pixel signals.

23. A method of reducing noise in a digital video signal generated by a sensor comprising a matrix of pixels generating a plurality of pixel signals, the method comprising:
   estimating a respective thermal noise level for each pixel signal in the plurality thereof based upon a first distribution;
   estimating a respective shot noise level for each pixel signal in the plurality thereof based upon a second Poisson distribution;
   estimating an average noise level associated with a group of pixel signals from the plurality thereof, the group of pixel signals defining at least a part of an image in the digital video signal;
   determining an average level of the group of pixel signals;
   determining a respective estimated noise level for the group of pixel signals by weighting the average noise level as a function of a ratio of the pixel signal and the average level of the group of pixel signals;
   estimating a respective noise level for each pixel signal by weighting the average noise level with a square root value of the ratio; and
   filtering each pixel signal with a respective attenuation factor based upon the respective estimated noise level.

24. A device for reducing noise in a digital video signal from a sensor comprising a matrix of pixels generating a plurality of pixel signals, the device comprising:
   an encoder; and
   an processor to be coupled to said encoder and configured to
      estimate a respective thermal noise level for each pixel signal in the plurality thereof based upon a first distribution,
      estimate a respective shot noise level for each pixel signal in the plurality thereof based upon a second Poisson distribution, estimate an average noise level associated with a group of pixel signals from the plurality thereof, the group of pixel signals defining at least a part of an image in the digital video signal, determine an average level of the group of pixel signals, determine a respective estimated noise level for the group of pixel signals by weighting the average noise level as a function of a ratio of the pixel signal and the average level of the group of pixel signals, estimate a respective noise level for each pixel signal by weighting the average noise level with a square root value of the ratio, and filter each pixel signal with a respective attenuation factor based upon the respective estimated noise level.

25. A computer-implemented method for reducing noise in a digital video signal from a sensor comprising a matrix of pixels generating a plurality of pixel signals, the method comprising:

estimating a respective thermal noise level for each pixel signal in the plurality thereof based upon a first distribution;

estimating a respective shot noise level for each pixel signal in the plurality thereof based upon a second Poisson distribution;

estimating an average noise level associated with a group of pixel signals from the plurality thereof, the group of pixel signals defining at least a part of an image in the digital video signal;

determining an average level of the group of pixel signals;

determining a respective estimated noise level for the group of pixel signals by weighting the average noise level as a function of a ratio of the pixel signal and the average level of the group of pixel signals;

estimating a respective noise level for each pixel signal by weighting the average noise level with a square root value of the ratio; and filtering each pixel signal with a respective attenuation factor based upon the respective estimated noise level.

* * * * *

UNITED STATES PATENT AND TRADEMARK OFFICE
CERTIFICATE OF CORRECTION

PATENT NO. : 8,687,095 B2  
APPLICATION NO. : 13/302174  
DATED : April 1, 2014  
INVENTOR(S) : Daniele Alfonso Page 1 of 1

It is certified that error appears in the above-identified patent and that said Letters Patent is hereby corrected as shown below:

In the Claims

Column 9, Line 27,      Delete: "an"  
Claim 12                Insert --a--

Column 10, Line 60,     Delete: "an"  
Claim 24                Insert --a--

Signed and Sealed this  
Ninth Day of June, 2015

Michelle K. Lee  
*Director of the United States Patent and Trademark Office*